(12) United States Patent
Bradfield

(10) Patent No.: US 6,707,225 B2
(45) Date of Patent: Mar. 16, 2004

(54) RADIUSED STATOR CORE END FACES

(75) Inventor: Michael Duane Bradfield, Anderson, IN (US)

(73) Assignee: Delco Remy International, Inc., Anderson, IN (US)

(*) Notice: Subject to any disclaimer, the term of this patent is extended or adjusted under 35 U.S.C. 154(b) by 89 days.

(21) Appl. No.: 09/793,283

(22) Filed: Feb. 26, 2001

(65) Prior Publication Data

US 2002/0117929 A1 Aug. 29, 2002

(51) Int. Cl.[7] ............................................. H02K 3/46
(52) U.S. Cl. ...................... 310/260; 310/216; 310/218; 310/259
(58) Field of Search ............................... 310/216–218, 310/254, 258, 259, 260

(56) References Cited

U.S. PATENT DOCUMENTS

| 1,122,187 | A | * | 12/1914 | Behrend | 310/260 |
| 5,604,389 | A | * | 2/1997 | Nitta et al. | 310/209 |
| 5,798,583 | A | * | 8/1998 | Morita | 29/596 |
| 6,066,905 | A | * | 5/2000 | Wright et al. | 310/179 |
| 6,069,431 | A | * | 5/2000 | Satoh et al. | 310/260 |
| 6,127,760 | A | * | 10/2000 | Nagasaki et al. | 310/216 |
| 6,157,109 | A | * | 12/2000 | Schiferl et al. | 310/254 |
| 6,211,595 | B1 | * | 4/2001 | Nose | 310/216 |
| 6,384,505 | B1 | * | 5/2002 | Horng et al. | 310/186 |

FOREIGN PATENT DOCUMENTS

| WO | WO 9512912 | 5/1995 |
| WO | WO 0069047 | 11/2000 |

* cited by examiner

*Primary Examiner*—Dang Le
(74) *Attorney, Agent, or Firm*—John P. O'Banion (57) ABSTRACT

A method for improving the efficiency of electromagnetic devices having a ferromagnetic core containing electrical windings. The ferromagnetic core is variously configured to include intra-turn ferromagnetic protrusions which are configured to nestle between junctions of the windings, such as in the bends, to increase the amount of ferromagnetic material retained proximal the windings. The increased amount of ferromagnetic material increases electromagnetic efficiency, and reduces the probability that the wiring will be nicked on the edges of the electromagnetic core. By way of example, the intra-turn ferromagnetic projections may be formed within an integrated electromagnetic core, as unitary core extensions, or as singular protrusions attached to the electromagnetic core.

12 Claims, 7 Drawing Sheets

RADIUSED STATOR CORE END FACES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to wire-wound ferromagnetic cores used in electromagnetic devices, and more particularly to a method and apparatus for increasing the amount of effective ferromagnetic mass without increasing device size.

2. Description of the Background Art

A variety of electromagnetic devices utilize a set of electrical windings wound upon a ferromagnetic core. The core typically comprises a set of laminated plates which are stamped-out from sheets of ferrous material, and which are configured with slots, or other means, for the proximal retention of the electrical windings.

An electrical generator typifies one such electromagnetic device, wherein a ferromagnetic stator core retains a set of windings. A typical stator is created from a set of stamped-out steel plates which are laminated together forming a stack. Each of the steel plates contains cutouts such that, when the plates are laminated together, channels are formed through which a set of windings can be routed. These windings are routed from one such channel to another within the stator. It should be understood that ferromagnetic cores may also be fabricated by processes that do not require laminating a stack of plates, for example the core may be pressed or molded from ferromagnetic materials.

Figure 1:
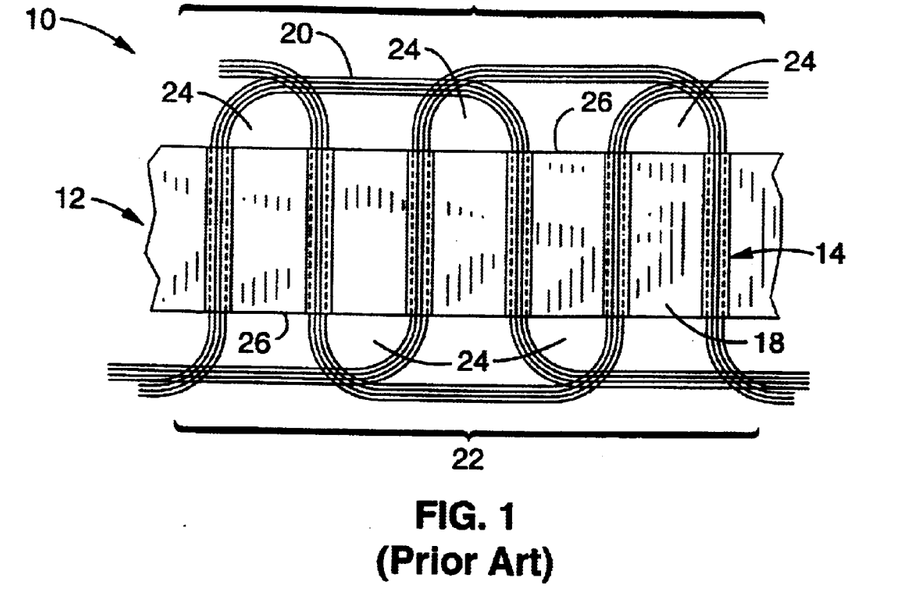
FIG. 1 is a plan view of a section from a conventional cylindrical stator shown with wiring wound through slots.
Figure 2:
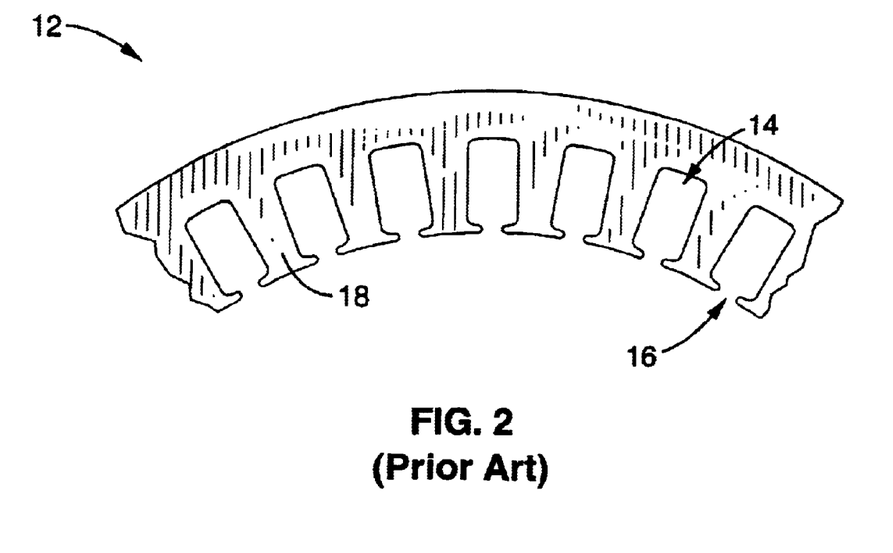
FIG. 2 is an end view of the conventional cylindrical stator section of FIG. 1 shown without windings.

For example, FIG. 1 shows a typical wire-wound stator 10, wherein a ferromagnetic core 12 has a number of slots 14 for receiving windings. FIG. 2 depicts the slots 14 with entry openings 16 shown prior to being wound. The portion of core material between each slot forms a core tooth 18. Referring again to FIG. 1, a set of windings 20 are shown routed through slots 14 between core teeth 18. A series of end turns 22 comprise portions of windings 20 which lie outside of slots 14 and bend from one slot to another slot. After exiting ferromagnetic core 12, windings 20 form a bend prior to entering another slot 14 of ferromagnetic core 12. As a result of these exterior bends, an intra-turn air space 24 is created between the turns of the wiring past the exterior faces 26 of stator core 12. Although a significant intra-turn air space typically exists for applications with medium to high current windings, the size and shape of the airs space depends on the layout of the core and how tightly the wires are bent.

The majority of stators follow this same basic design, despite the fact that the electromagnetic device industry is highly competitive. A need still exists, however, for increasing the efficiency of stator cores and wound cores in general. The present invention satisfies that need, as well as others, and overcomes the deficiencies of previously developed solutions.

BRIEF SUMMARY OF THE INVENTION

The present invention is directed to increasing the amount of ferromagnetic material which may be retained proximal to the windings on a ferromagnetic core. A standard core configuration may be modified to include radiused ferromagnetic protrusions capable of nestling between the intra-turn spaces between the windings. A number of embodiments are provided which exemplify the inclusion of intra-turn ferromagnetic protrusions within an electromagnetic core.

By way of example, and not of limitation, in one embodiment of the invention an intra-turn lamination member, containing intra-turn ferromagnetic projections, is added to the ends of the ferromagnetic core. The intra-turn lamination member includes radiused protrusions of ferromagnetic material that nestle within the intra-turn spaces of the winding as the wires exit the ferromagnetic core. The intra-turn lamination member preferably comprises ferromagnetic material and is attached to the stator so as to increase the ferromagnetic mass proximal the windings. In another embodiment, the ferromagnetic core is manufactured or fabricated with integral ferromagnetic radiused protrusions which nestle in the intra-turn windings. In another embodiment the intra-turn ferromagnetic projections are added to only small portions of the electromagnetic core over which a winding is received.

An object of the invention is to increase the efficiency of a wound electromagnetic device without increasing the core size.

Another object of the invention is to reduce the probability of nicking the insulation on the wire strands which comprise the windings.

Another object of the invention is to decrease the amplitude of the air noise associated with air movement proximal to a wound core used in a moving electromagnetic device.

Another object of the invention is to provide enhanced electromagnetic core efficiency while substantially retaining the use of current manufacturing processes.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 3 through FIG. 16. It will be appreciated that the apparatus may vary as to configuration and as to details of the parts, and that the method may vary as to the specific steps and sequence, without departing from the basic concepts as disclosed herein.

The present invention increases the mass of ferromagnetic material within the ferromagnetic core of an electromagnetic device without increasing the size of the core or requiring a decrease in the bend radius of the end turns in the winding. The ferromagnetic material of the core is augmented by the inclusion of intra-turn ferromagnetic protrusions which are configured to nestle within the spaces that would otherwise exist between the bends in the winding as it exits the core of the electromagnetic device.

Figure 3:
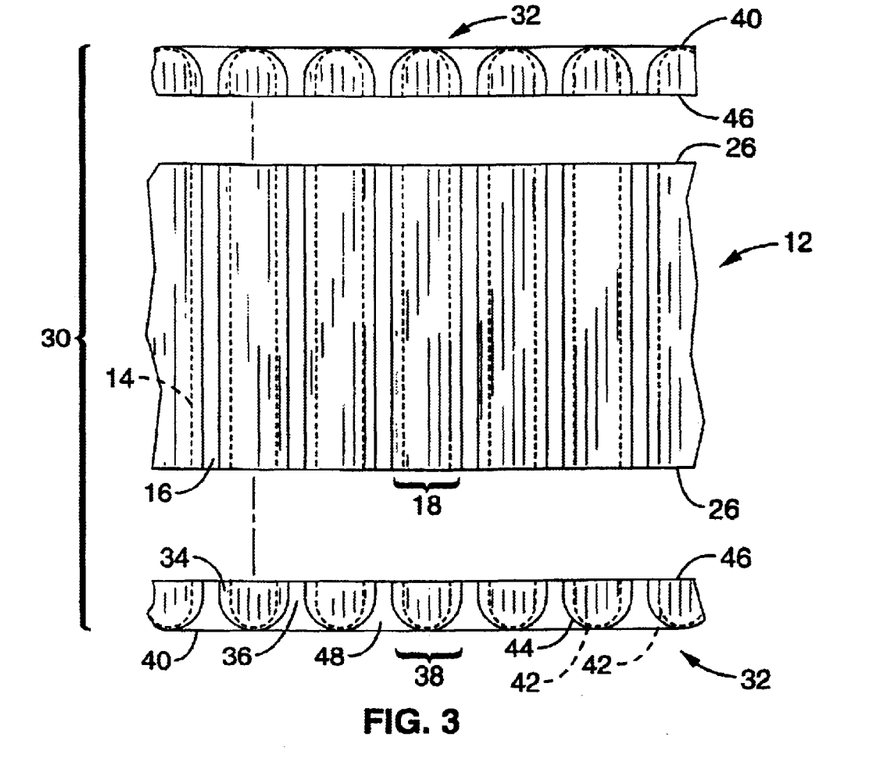
FIG. 3 is a plan view of a section of unwound conventional stator to which intra-turn lamination members are being attached according to an embodiment of the present invention.

FIG. 3 Is a conventional stator core 12 shown with intra-turn lamination members 32, having intra-turn ferromagnetic projections, being attached prior to winding of the core to form a stator core 30 according to the present invention. As in the typical stator, a ferromagnetic core 12 contains slots 14, with slot openings 16, and stator teeth 18. However, in accordance with this embodiment of the invention, a pale of intra-turn lamination members 32 are being attached to the stator to reduce intra-turn air space 24 as depicted in FIG. 1, by filling the air space with ferromagnetic material from an intra-turn ferromagnetic projections of intra-turn lamination member 32. Intra-turn lamination member 32, is configured with slots 34, slot openings 36, and teeth 38 which generally correspond with the profile of stator 12. The exterior end surfaces 40 of Intra-turn lamination members 32, face away from stator section 12, with the majority of the radiused portion of tooth 38 comprising smoothly contoured Intra-turn ferromagnetic projections 39, whose exterior surface is bounded by the radiused exterior 42 of slot 34. A radiused exterior 44 is also provided for slot opening 36 to facilitate the smooth routing of the wiring, although it typically does not operate to fill the intra-turn spacing within the winding. Radiused exterior 44 can be referred to as a lip that is preferably provided to extend from the intra-turn lamination member facing away from the ferromagnetic core to aid in securing the wiring wound over the tooth and the associated portion of the Intra-turn lamination member. The radiused exteriors 42, 44 of the tooth 38 provide a smooth transition for the wiring of the stator windings as they pass from one stator slot and are bent in transition to re-enter at another stator slot. Opposite exterior surface 40 of intra-turn lamination member 32 is an interior surface 46 which is configured for attachment to the body of statue 12. The various teeth 38 of intra-turn lamination member 32 are preferably attached to a body section 48 which should typically correspond to the general shape and size of the body of stator 12. It will however, be appreciated that the radiused teeth 38 of the intra-turn lamination members 32 may be separately adjoined to the facing portions of the stator teeth, or variously integrated with other forms of body sections. The Intra-turn lamination members 32, are preferably manufactured by compacting powdered metal into a thick lamination capable of filling the air-gaps to support any desired bond radius. Intra-turn lamination member 32, therefore, is preferably thicker than that of the generally plate-like metal laminations, being optimally sized so that the radiused protrusions fill the radiused bends of the wire windings.

Figure 4:
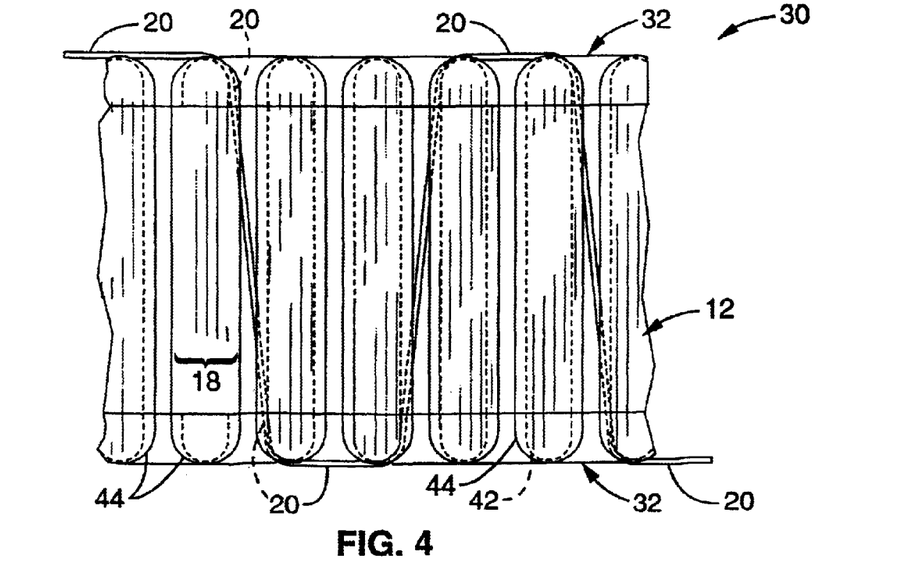
FIG. 4 is a plan view of the unwound stator section of FIG. 3 shown assembled with the intra-turn lamination members according to the present invention and illustrating a wire routing path therein.

FIG. 4 shows a wiring path through a stator core to which are attached intra-turn lamination members according to an embodiment of the invention. A path is shown by which a wire 20 could be routed among the slots within stator 12 and intra-turn lamination member 32.

Figure 5:
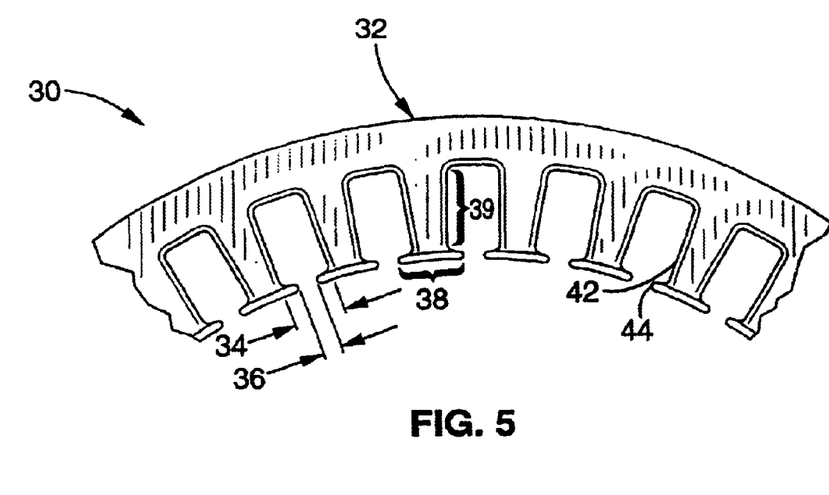
FIG. 5 is an end view of the stator section of FIG. 4 having attached intra-turn lamination members according to the present invention, and shown prior to the addition of windings.

FIG. 5 depicts a section of an unwound stator core 30 to which intra-turn lamination member 32 having teeth 38 with radiused exterior 42 of slot 34 and radiused exterior 44 of slot opening 36 has been attached prior to winding of the core. The shape of the intra-turn lamination member 32 shown in FIG. 5 substantially matches that of stator core 12 upon which it is attached, as is apparent by a comparison with FIG. 2. It should be recognized, however, that intra-turn lamination member 32 need not necessarily match the shape of the original core to which it is attached, as numerous shape variants can be implemented which provide filling of intra-turn air gap 24.

The ferromagnetic material provided by intra-turn ferromagnetic projections, such as exemplified within intra-turn lamination members 32, are cumulative to the ferromagnetic material contained in a conventional electromagnetic core and are retained in close proximity to the windings of the core. Improved efficiency within the electromagnetic device results from the increase in ferromagnetic material mass that is achieved proximal the windings without a concomitant increase in the overall length of the wound stator, or by compromising the integrity of the windings by the utilization of tighter radius bends. Additionally, it will be appreciated that the use of intra-turn ferromagnetic projections should permit the safe use of tighter windings with smaller bend radii, since the smooth transition provided by the intra-turn ferromagnetic projections reduces the risk of compromising the integrity of the wire insulation, such as by nicking. In addition to the aforesaid benefits, reduced levels of noise are achieved within certain electromagnetic devices in which air moves rapidly about the wound core. This noise reduction is provided as a result of the reduced air gap spacing within the windings which modify the air flow pattern to thereby reduce the sound amplitude.

Figure 6:
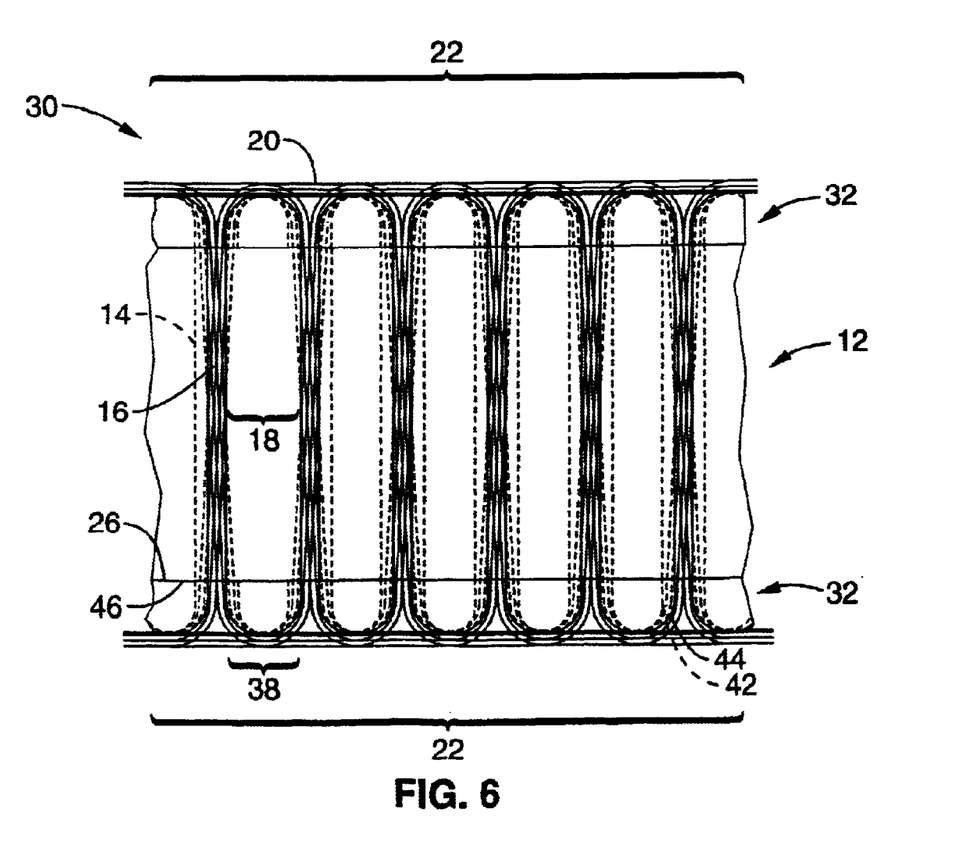
FIG. 6 is a plan view of the stator section of FIG. 4 shown subsequent to winding.
Figure 7:
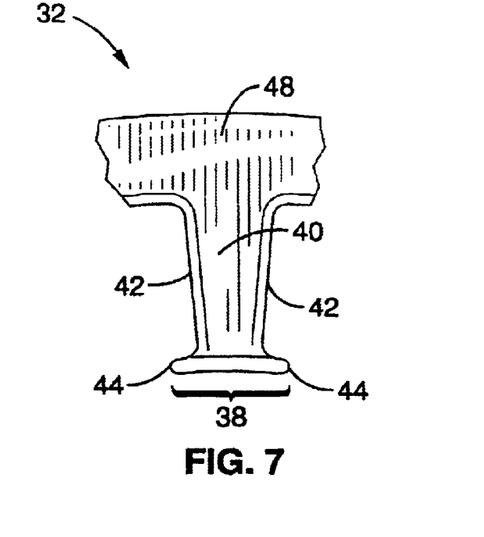
FIG. 7 is a front view of a single core tooth portion of the intra-turn lamination member according to the present invention and shown in isolation.

FIG. 6 shows a wound stator 30 having intra-turn lamination members according to an embodiment of the present invention. As in the typical stator, a ferromagnetic core 12 contains slots 14, with slot openings 16, and stator teeth 18, while windings 20 passing through slots 14 form end turns 22 on the portion of their path that lies outside of the standard ferromagnetic core 12. The intra-turn lamination members 32 contain ferromagnetic material, a portion of which comprises the intra-turn ferromagnetic projections which fill the intra-turn air-gaps 24 which were visible in FIG. 1. The correspondence between teeth 18 of stator core 12 and teeth 38 of intra-turn lamination member 32 are clearly visible.

Figure 8:
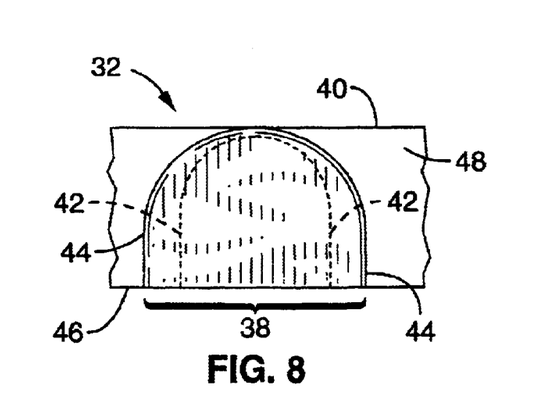
FIG. 8 is a detailed end view of a single core tooth portion of FIG. 7, which shows the tip of the core tooth.
Figure 9:
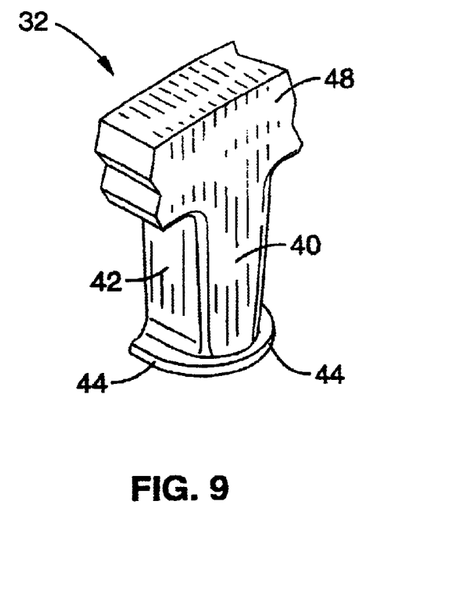
FIG. 9 is a front perspective view of the core tooth portion shown in FIG. 8.
Figure 10:
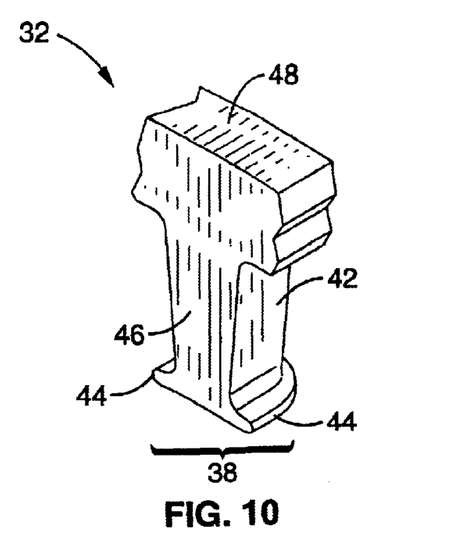
FIG. 10 is a rear perspective view of the core tooth portion shown in FIG. 9.

FIG. 7 through FIG. 10 illustrate a tooth section 38 shown extending from a body section 48 of intra-turn lamination member 32 from various angles which depict the radiused exterior 42 about the edge forming slot 34 and radiused exterior 44 about the edge forming slot opening 36. FIG. 8 is shown from the tip of stator tooth 38 wherein exterior profile 40 and interior profile 46 are visible. FIG. 9 provides a front view of exterior end surface 40 which illustrates radiused exteriors 42, 44 of the intra-turn lamination member 32. It will be appreciated that the tip of tooth 38 is configured as a lip around edge 44 forming slot opening 36 to improve winding retention. FIG. 10 provides a rear view of interior surface 46.

Figure 11:
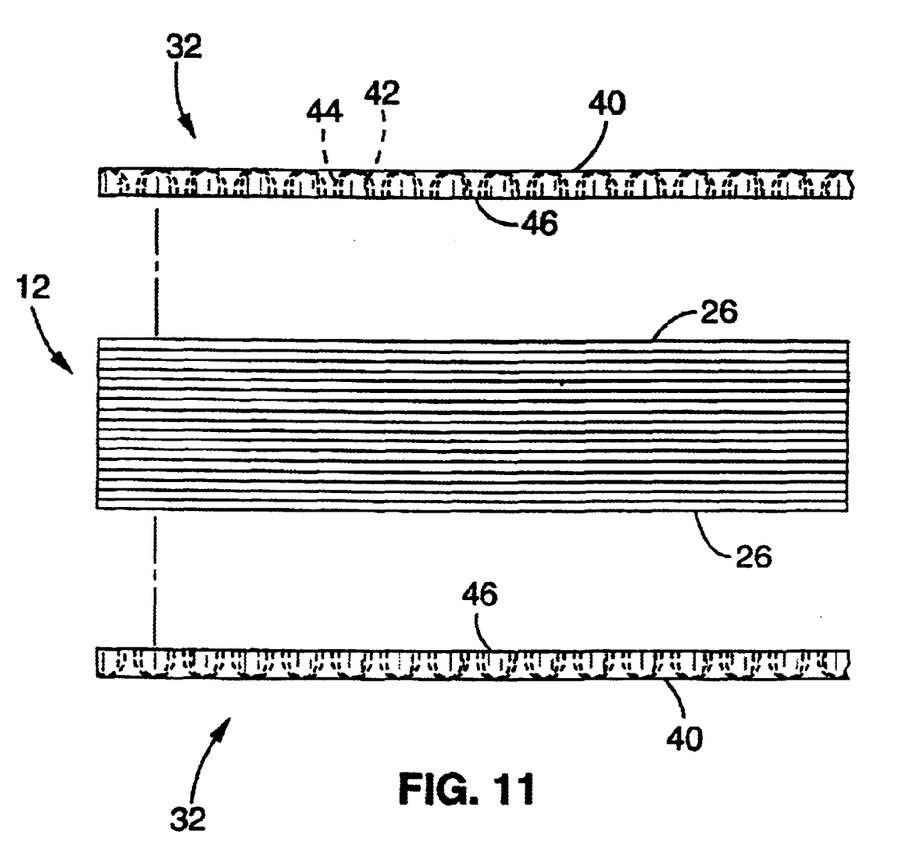
FIG. 11 is an exterior plan view of a complete cylindrical stator core to which intra-turn lamination members are shown being attached prior to winding.

FIG. 11 is a pair of intra-turn lamination members 32 being assembled with interior surface 46 to be attached to the end surface 26 of circular stator core 12 which comprises a series of ferromagnetic laminations. It should, however, be appreciated that the invention may be practiced on any electromagnetic device containing a winding.

Figure 12:
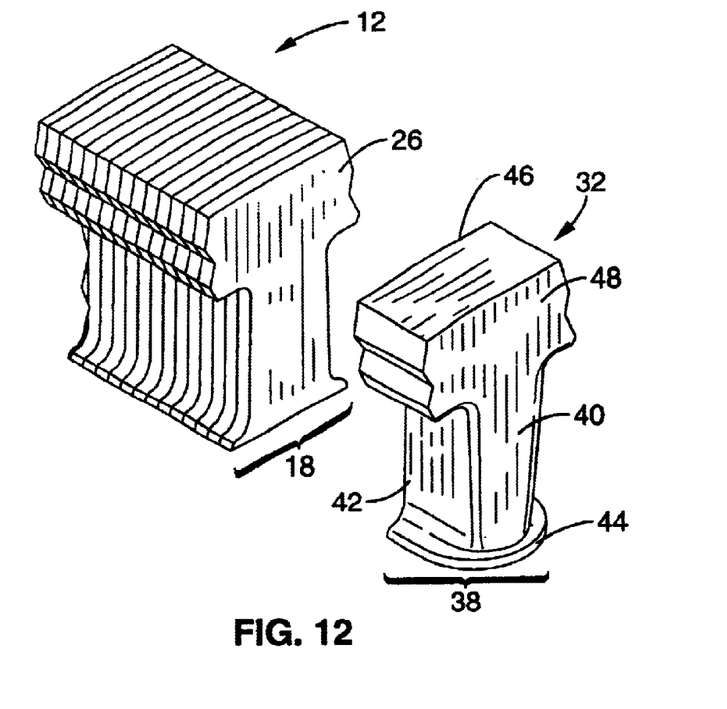
FIG. 12 is a front perspective view of a tooth portion of an intra-turn lamination member that is shown prior to attachment to a corresponding electromagnetic core portion.

FIG. 12 is a section of an intra-turn lamination 32, having a tooth 38 and a section of body 48, which are being attached to a section from a stator core 12. The interior surface 46 of the intra-turn lamination member 32 is being attached to the end surface 26 of the stator core. The figure illustrates the relationship between the sides of a stator tooth 18 and the radiused exteriors 42 for forming slot 34, and the radiused exterior 44 for forming slot opening 36 within intra-turn lamination member 32.

Figure 13:
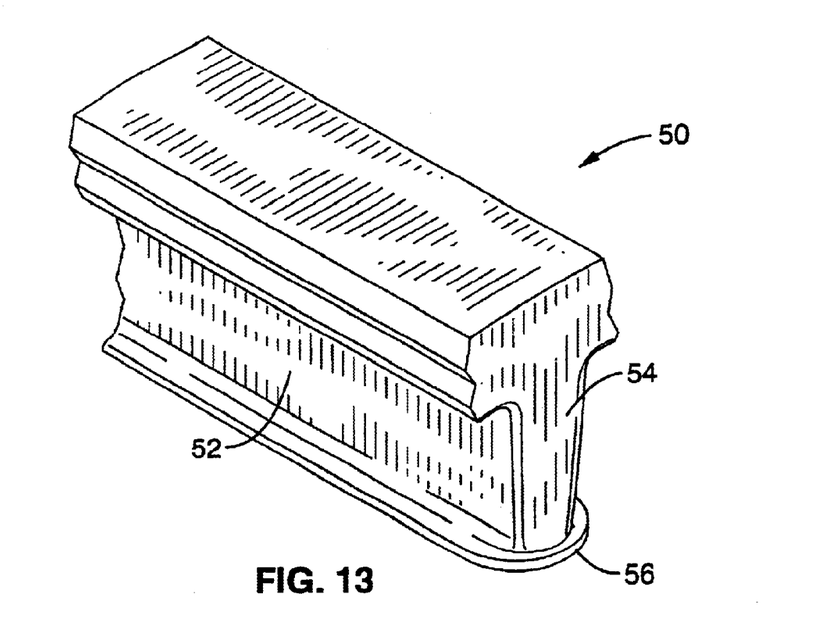
FIG. 13 is a front perspective view of an intra-turn ferromagnetic protrusion incorporated within a tooth portion of a non-laminated core according to another embodiment of the present invention.

FIG. 13 illustrates an alternative embodiment 50 of an electromagnetic core. It will be appreciated that the intra-turn laminations taught within the present invention may be widely practiced within various implementations of ferromagnetic core assemblies without departing from the teachings of the present invention. The depicted embodiment shows a tooth portion 52 of a stator core 50 in which an intra-turn core extension 54, with edge of slot opening 56, has been integrated with the stator core portion. In this embodiment, the ferromagnetic core is fabricated as a single non-laminated unit having protruding radiused extensions. The ends of the stator core itself within this embodiment are configured with intra-turn ferromagnetic projections as part of core extension 54 for filling the air-gaps that would otherwise exist within the windings. It will be appreciated that the intra-turn lamination elements may be integrated with the entire stator, or any part thereof, in order to provide intra-turn ferromagnetic protrusions for filling the intra-turn winding spaces.

Figure 14:
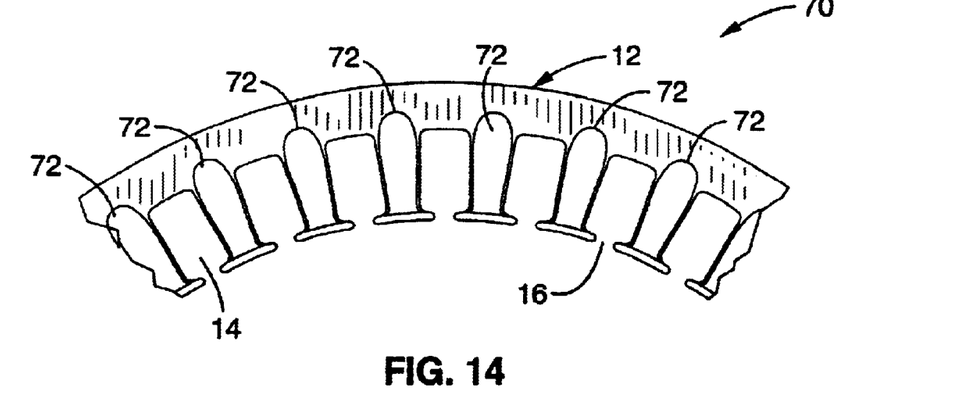
FIG. 14 is a front view of intra-turn ferromagnetic protrusions according to another embodiment of the present invention which are shown separately attached to a stator core assembly.

FIG. 14 illustrates another embodiment 70 having separate intra-turn ferromagnetic protrusions 72 attached to a stator core 12 and which are capable of filling intra-turn spaces 24 within a set of windings. The intra-turn ferromagnetic protrusions 72 may be bonded to the electromagnetic core, or applied as a liquid containing ferromagnetic material which hardens to form the protrusions on portions of the electromagnetic core which fill in the spaces that would otherwise exist within the windings.

Figure 15:
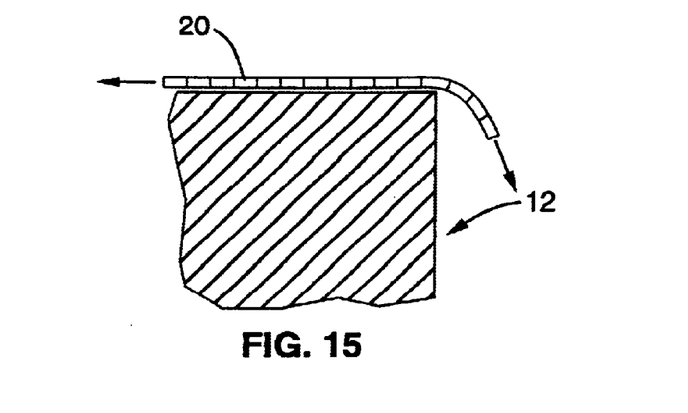
FIG. 15 is a cross-section of a wire interface between a conventional stator core and a representative single wire from the wound core.
Figure 16:
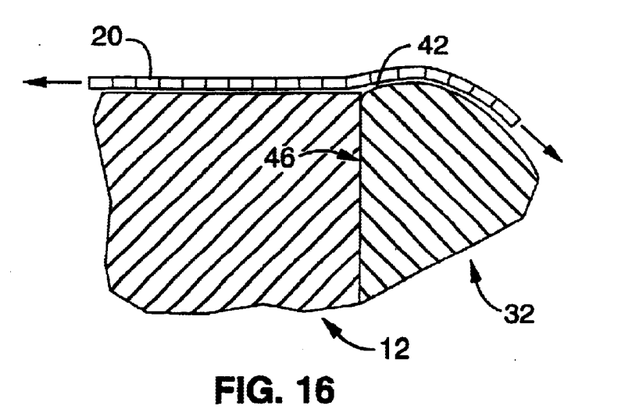
FIG. 16 is a cross-section of a wire interface between a core having intra-turn ferromagnetic protrusions according to aspects of the present invention and a representative single wire from the wound core.

FIG. 15 and FIG. 16 show a comparison between a bend in a wire 20 which is formed upon transitioning from a conventional stator core 12 of FIG. 15, and from a stator core 12 of FIG. 16 to which is attached an intra-turn lamination member 32. The drawings represent cross sections of the stators as viewed from the slot and the narrow slot opening are omitted for the sake of clarity. The sharp edge of stator 12 in FIG. 15 is adjacent wire 20, and the possibility of shorting is dependent on how tightly the bend radius is formed and the particular surface proffered by the edge of stator 12. It should be noted that typical stators are formed from a stack of laminated steel plates which are typically fabricated by a stamping process, therefore, these stamped plates often exhibit sharp peripheral edges characteristic of stamped articles. FIG. 16 represents the smooth transition afforded wire 20 by the use of intra-turn lamination member 32. The smooth wire transitions provided by the intra-turn lamination member 32 reduces the probability of nicking or cutting the wire insulation on the exterior edge of the stator core, which can cause, or lead to, an electrical short in the winding. It will be appreciated that since registration of intra-turn lamination member 32 with the stator is subject to a degree of positioning inaccuracy during assembly, the intra-turn lamination member is shown configured with a slightly enlarged and radiused interior surface 46 near the edges of stator core 12, to prevent the sharp stator core edges from cutting into the windings despite any mis-registration that may exist between stator core 12 and intra-turn lamination member 32. It should be appreciated that the intra-turn lamination members 32 can thereby reduce the probability of electrical shorts within the windings, in addition to beneficially increasing the amount of ferromagnetic material that is retained proximal to the windings.

A variety of fabrication processes may be utilized in creating intra-turn lamination members, or intra-turn core extensions according to the present invention. Typically, the process of stamping or die-cutting, which is used for fabricating the flat, substantially two-dimensional, steel sheet for a standard laminated core are not conducive to fabricating a three-dimensional structure such as required of the intra-turn lamination members. Therefore, in a preferred process, powdered metal is compressed until it forms a continuous intra-turn lamination member. Alternative fabrication processes may be utilized which include additive processes such as molding of the intra-turn lamination member from a ferromagnetic material or a material comprising ferromagnetic particles. In addition, the intra-turn lamination members may be formed by subtractive processes such as machining or etching, however in general, use of these subtractive processes increases fabrication expense. Once fabricated, the intra-turn lamination members are attached to the ends of the standard laminated core. It will be recognized that the process of fabricating the intra-turn lamination member may be combined with the attachment process wherein the intra-turn lamination member is fabricated directly on the ends of the standard laminated core. As can be seen, the intra-turn lamination members are readily fabricated and incorporated into existing electromagnetic cores to provide enhanced efficiency, lowered levels of noise, and increased reliability.

Accordingly, it will be seen that the present invention, which is represented by way of example as stator core embodiments for an electric generator, is generally applicable to any form of wound electromagnetic device, including devices such as motors, generators, alternators, rotational actuators, rotational solenoids, linear actuators, yokes, and variations thereof. It will be appreciated that the embodiments of the invention were provided by way of example and that wide variation may exist with regard to the practice of the invention. Specifically, it should be recognized that the shape of the intra-turn lamination member is subordinate to the shape and implementation of the specific electromagnetic core and its windings, insofar as the intra-turn ferromagnetic projections still provides for filling gaps between windings.

Although the description above contains many specificities, these should not be construed as limiting the scope of the invention but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 36 U.S.C. 112, sixth paragraph, unless the element is expressly recited using the phrase "means for."

What is claimed is:

1. In an electromagnetic device having a ferromagnetic core and a set of windings, the improvement comprising:
   a ferromagnetic intra-turn lamination member attached between the core and the windings; and
   a plurality of radiused projections extending from said ferromagnetic intra-turn lamination member and formed having any desired radius for filling curved spaces between turns of the windings;
   whereby an increase in efficiency may be achieved by the inclusion of additional ferromagnetic material proximal to the windings.

2. In an electromagnetic device having a ferromagnetic core with at least one wire establishing a set of windings, the improvement comprising:
   a plurality of radiused projections extending from the ends of said ferromagnetic core which are formed having any desired radius for filling spaces between the turns within said windings said wire being at least partially wound around said radiused projections.

3. A ferromagnetic core for an electromagnetic device which is capable of receiving a winding established by at least one wire, comprising:
   (a) a base member containing ferromagnetic material;
   (b) means for retaining a winding upon said base member; and
   (c) means for extending said base member into curved spaces of any size which exist between bends of the winding, said wire being at least partially wound around said means for extending said base member.

4. A ferromagnetic core as recited in claim 3, wherein said means for extending said base member into curved spaces between bends of the windings comprises a separate member joined to an end of said base member.

5. A ferromagnetic core as recited in claim 3, wherein said means for extending said base member into curved spaces between bends of the windings comprises radiused projections on said base member.

6. A ferromagnetic core for an electromagnetic device, comprising:
   (a) a base member having cutouts configured for receiving a winding which is bent upon exit from one cutout to then enter another cutout, said winding being established by at least one wire; and
   (b) a ferromagnetic extension joined to said base member and having radiused projections which are configured of a sufficient size to nestle in the curved spaces of any size that would otherwise exist between the bends of said winding exiting said cutouts, said wire being at least partially wound around said ferromagnetic extension.

7. A ferromagnetic core as recited in claim 6, wherein the ferromagnetic extension is formed from compacted powdered ferrous material.

8. A ferromagnetic core as recited in claim 6, wherein the ferromagnetic extension is molded from a material containing ferrous particles.

9. A ferromagnetic core as recited in claim 6, further comprising a wire retention lip which projects from the ferromagnetic extension to aid in proximal retention of wiring upon the radiused projection of the extension.

10. A core extension member capable of being joined to the ferromagnetic core of an electromagnetic device configured to receive a set of windings, said winding being established by at least one wire, comprising:
    (a) a body;
    (b) a first side of said body configured for attachment to one side of said ferromagnetic core; and
    (c) a second side of said body containing ferromagnetic material and configured with radiused teeth of a sufficient size for nestling between the curved spaces of any size within the set of windings, said wire being at least partially wound around said radiused teeth;
    whereby the additional ferromagnetic material is retained proximal said windings.

11. A core extension member as recited in claim 10, wherein said body comprises a plurality of separate protruding members attached to an end of the ferromagnetic core wherein portions of the body are configured to individually nestle between the curved spaces within the windings.

12. A core extension member as recited in claim 10, wherein said body is substantially configured in the shape of the ferromagnetic core upon which it is to be attached.

* * * * *